United States Patent
Lee et al.

(10) Patent No.: US 12,007,333 B2
(45) Date of Patent: Jun. 11, 2024

(54) SYSTEM FOR INSPECTING THIN GLASS

(71) Applicants: Samsung Display Co., Ltd., Yongin-si (KR); DIGITAL IMAGING TECHNOLOGY, Hwaseong-si (KR)

(72) Inventors: Janghoon Lee, Yongin-si (KR); Jin Woo Kim, Hwaseong-si (KR); Cheol Hyun Cho, Hwaseong-si (KR); Jayoung Cho, Yongin-si (KR); Leegu Han, Yongin-si (KR)

(73) Assignees: SAMSUNG DISPLAY CO., LTD., Gyeonggi-Do (KR); DIGITAL IMAGING TECHNOLOGY, Gyeonggi-Do (KR)

( * ) Notice: Subject to any disclaimer, the term of this patent is extended or adjusted under 35 U.S.C. 154(b) by 233 days.

(21) Appl. No.: 17/729,344

(22) Filed: Apr. 26, 2022

(65) Prior Publication Data
US 2023/0042179 A1    Feb. 9, 2023

(30) Foreign Application Priority Data

Aug. 3, 2021 (KR) .......... 10-2021-0102249

(51) Int. Cl.
*G01N 21/88* (2006.01)
*G01N 21/958* (2006.01)

(52) U.S. Cl.
CPC ....... *G01N 21/8851* (2013.01); *G01N 21/958* (2013.01); *G01N 2021/8867* (2013.01)

(58) Field of Classification Search
CPC ............ G01N 21/8851; G01N 21/958; G01N 2021/8867; G01N 21/896; G01N 21/8901; G01N 21/93; B65G 49/064; B65G 2201/022
See application file for complete search history.

(56) References Cited

U.S. PATENT DOCUMENTS

| | | | |
|---|---|---|---|
| 6,437,357 B1 * | 8/2002 | Weiss | G01N 21/896 |
| | | | 250/559.46 |
| 9,291,577 B2 * | 3/2016 | Lee | G01N 21/958 |
| 2010/0214564 A1 * | 8/2010 | Kim | G01N 21/896 |
| | | | 356/337 |
| 2022/0092765 A1 * | 3/2022 | Song | B23Q 3/155 |

FOREIGN PATENT DOCUMENTS

| | | |
|---|---|---|
| KR | 200321645 Y1 | 7/2003 |
| KR | 1020110117867 A | 10/2011 |
| KR | 101272299 B1 | 6/2013 |
| KR | 101677016 B1 | 11/2016 |

* cited by examiner

*Primary Examiner* — Hung V Nguyen
(74) *Attorney, Agent, or Firm* — CANTOR COLBURN LLP

(57) ABSTRACT

A system for inspecting thin glass includes: a housing including a body and a cover; a first shuttle which fixes an edge portion of the thin glass and reciprocates in a first axis direction; a first inspection part disposed on the body and which measures a position of a defect formed in the thin glass by taking a picture of the thin glass; a transport shuttle which separates the thin glass from the first shuttle, a second shuttle which separates the thin glass from the transport shuttle, fixes the thin glass, and reciprocates the upper surface of the body; and a second inspection part disposed on the body and spaced apart from the first inspection part and which inspects the position of the defect by taking an enlarged picture of the position of the defect. The first shuttle tensions and fixes the thin glass.

12 Claims, 12 Drawing Sheets

SYSTEM FOR INSPECTING THIN GLASS

This application claims priority to Korean Patent Application No. 10-2021-0102249, filed on Aug. 3, 2021, and all the benefits accruing therefrom under 35 U.S.C. § 119, the content of which in its entirety is herein incorporated by reference.

BACKGROUND

1. Field

Embodiments relate to a system for inspecting thin glass. More specifically, the embodiments relate to the system for inspecting the thin glass capable of inspecting a defect in a state in which the thin glass is stretched so that wrinkles do not occur in order to inspect the defect that may occur in a manufacturing step of the thin glass.

2. Description of the Related Art

With a recent increase in demand for smartphones, a new growth industry of electronic products related to a flexible display is in full swing. In order to manufacture the flexible display, an ultra-thin glass is used.

The ultra-thin glass is tempered glass with a thickness of about 100 micrometers or less and has less impact when folded or bent so that the ultra-thin glass is not broken compared to general glass even though the ultra-thin glass is very thin.

Compared to general tempered glass, the ultra-thin glass is difficult to manufacture and has a high defect rate. Therefore, related companies are expanding their efforts to stabilize a manufacturing process, reduce the defect rate, and reduce labor costs.

In particular, in order to guarantee a quality of the ultra-thin glass, a surface condition (e.g., bubbles, foreign substances, cracks, chipping, etc.) is inspected using an inspection system.

SUMMARY

Embodiments provide a system for inspecting thin glass identifying a location and type of a defect occurring in ultra-thin glass.

Also, embodiments provide the system for inspecting the thin glass maintaining a state in which wrinkles do not occur in the ultra-thin glass in order to inspect the defect of the ultra-thin glass.

In particular, embodiments provide the system for inspecting the thin glass preventing the ultra-thin glass from being separated from the tensile part in a process of fixing the ultra-thin glass so that the wrinkles do not occur.

A system for inspecting a thin glass according to an embodiment includes: a housing including a body and a cover covering an upper surface of the body; a first shuttle which fixes an edge portion of the thin glass to an upper side thereof and reciprocates from a front end portion of the upper surface of the body to a central portion of the upper surface of the body in a first axis direction; a first inspection part disposed on the body and which measures a position of the defect formed in the thin glass by taking a picture of the thin glass while moving in a second axis direction perpendicular to the first axis direction, wherein the thin glass is fixed to the first shuttle, a transport shuttle which separates the thin glass from the first shuttle moved to the central portion and fixes the thin glass on a lower side of the transport shuttle; a second shuttle which separates the thin glass from the transport shuttle, fixes the thin glass to an upper side of the second shuttle, and reciprocates from the central portion to a rear end portion of the upper surface of the body; and a second inspection part disposed on the body and spaced apart rearward from the first inspection part and which inspects the position of the defect by taking an enlarged picture of the position of the defect measured by the first inspection part. The first shuttle tensions and fixes the thin glass to prevent wrinkling of the thin glass.

In an embodiment, the thin glass may have a rectangular shape such that a pair of first side portions disposed in the first axis direction and a pair of second side portions disposed in the second axis direction are formed in the edge portion, and a first shuttle guide extending from the front end portion to the central portion may be disposed on the upper surface of the body. The first shuttle may include: a first moving member which slides along the first shuttle guide; a first plate defining a plurality of first plate suction holes and coupled to the first moving member, where the plurality of first plate suction holes may adsorb a central portion of a lower surface of the thin glass; a first tensioning part provided on opposite sides in the first axis direction of the first plate and which adsorbs a lower surface of the first side portions of the thin glass and tensions the lower surface of the first side portions of the thin glass in the first axis direction; and a second tensioning part provided on opposite sides in the second axis direction of the first plate and which adsorbs a lower surface of the second side portions of the thin glass and tensions the lower surface of the second side portions of the thin glass in the second axis direction.

In an embodiment, the second tensioning part may tension the thin glass after the first tensioning part tensions the thin glass.

In an embodiment, the first tensioning part may include a first tensioning plate extending in the second axis direction and defining at least one first suction hole which adsorbs the lower surface of the first side portions of the thin glass, and the second tensioning part may include a second tensioning plate extending in the first axis direction and defining at least one second suction hole which adsorbs the lower surface of the second side portions of the thin glass.

In an embodiment, a length of the first tensioning plate in the second axis direction may be greater than a length of the first plate in the second axis direction, and a length of the second tensioning plate in the first axis direction may be equal to a length of the first plate in the first axis direction.

In an embodiment, the system may further include a first contact member disposed between the thin glass and the first tensioning plate to prevent the thin glass adsorbed on the first tensioning plate from being separated from the first tensioning plate during a tensioning process of the thin glass and a second contact member disposed between the thin glass and the second tensioning plate to prevent the thin glass adsorbed on the second tensioning plate from being separated from the second tensioning plate during the tensioning process of the thin glass.

In an embodiment, a component ratio of urethane contained in each of the first contact member and the second contact member may be about 20 percentages (%) to about 30%.

In an embodiment, the first shuttle reciprocates a certain number of times, the first inspection part may include: a fourth moving member spaced apart from the upper surface of the body and which reciprocates in the second axis direction; a first camera coupled to the fourth moving member and which measures the position of the defect formed in the thin glass by taking a picture of the upper surface of the thin glass, where the fourth moving member may reciprocate in the second axis direction; and a first control part which determines the number of reciprocations of the first shuttle and a position of the fourth moving member according to a length of the thin glass in the second axis direction.

In an embodiment, the second inspection part may include: a fifth moving member spaced apart from a rear side of the fourth moving member and which reciprocates in the second axis direction; a second camera coupled to the fifth moving member and which takes an enlarged picture of a certain area of the upper surface of the thin glass, where fifth moving member may reciprocate in the second axis direction; and a second control part which determines a position of the second shuttle and a position of the fifth moving member so that the position of the defect measured by the first camera may be located in the certain area.

In an embodiment, the system may further include: a third camera guide extending in a third axis direction having a predetermined angle with respect to the upper surface of the body at one side of the fifth moving member; and a sixth moving member which slides along the third camera guide, where the second camera may be coupled to the fifth moving member while being fixed to the sixth moving member, and the second control part may control the second camera to take a picture again while changing a position of the sixth moving member when an image of the defect located in the certain area in the enlarged picture taken by the second camera is out of focus.

In an embodiment, the system may further include: a second shuttle guide extending from the central portion to the rear end portion on the upper surface of the body; and a third shuttle guide extending from the central portion to an upper side, and the second shuttle may include: a second moving member which slides along the second shuttle guide and a second plate defining a plurality of second plate suction holes and coupled to the second moving member, where the plurality of second plate suction holes may adsorb a central portion of the lower surface of the thin glass, and the transport shuttle may include: a third moving member which slides along the third shuttle guide and a third plate defining a plurality of third plate suction holes and coupled to the third moving member, where the plurality of third plate suction holes may adsorb a central portion of the upper surface of the thin glass.

In an embodiment, the first shuttle may include: a driving part which provides rotational power; a support part having a first end extended to support the first plate and screwed to the first moving member, and a connecting member connecting a second end of the support part and the driving part to raise or lower the first plate by rotating the support part, where the second end is opposite to the first end.

A system for inspecting thin glass according to embodiments of the invention may identify a location of a defect and a type of the defect occurring in an ultra-thin glass.

Also, the system for inspecting the thin glass according to embodiments of the invention may maintain a state in which the ultra-thin glass is not damaged and wrinkles do not occur in the ultra-thin glass in order to inspect the defect of the ultra-thin glass.

In particular, the system for inspecting the thin glass according to embodiments of the invention may prevent the ultra-thin glass from being separated from the tensile part in the process of fixing the ultra-thin glass so that wrinkles do not occur.

DETAILED DESCRIPTION

Figure 1:
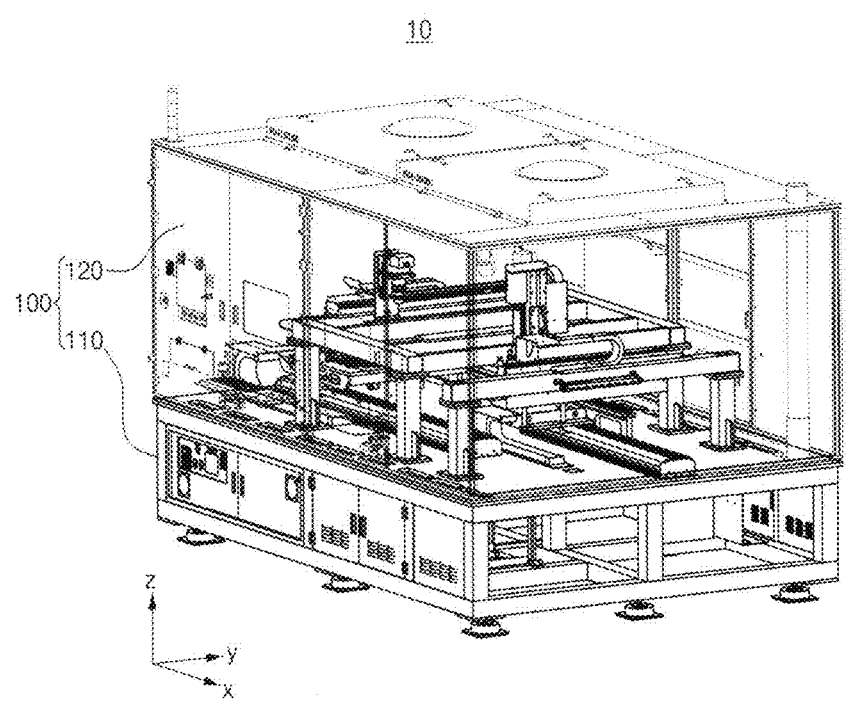
FIG. 1 is a perspective view of a system for inspecting thin glass according to an embodiment of the invention.

Hereinafter, display devices in accordance with embodiments will be described in more detail with reference to the accompanying drawings. The same reference numerals are used for the same components in the drawings, and redundant descriptions of the same components will be omitted.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "on" another element, it can be directly on the other element or intervening elements may be present therebetween. In contrast, when an element is referred to as being "directly on" another element, there are no intervening elements present.

Hereinafter, an X-axis of FIG. 1 is defined as a first axis, a Y-axis is a second axis, and a Z-axis is a third axis. In addition, a direction to which the X-axis faces is defined as a rear direction, a direction to which the Y-axis faces is defined as a right direction and a direction to which the Z-axis faces is defined as an upper direction.

Terms such as 'first' and 'second' may be used to describe various elements, but the elements should not be limited by the above terms. The above term may be used only for the purpose of distinguishing one component from another. For example, without departing from a scope of the invention, a 'first component' may be termed a 'second component', and similarly, a 'second component' may also be termed a 'first component'.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

The invention relates to a system for inspecting thin glass, wherein a system for inspecting thin glass according to an embodiment of the invention inspects a defect in a state in which the thin glass is stretched so that wrinkles do not occur in order to inspect the defect that may occur in a manufacturing step of the thin glass.

Figure 2:
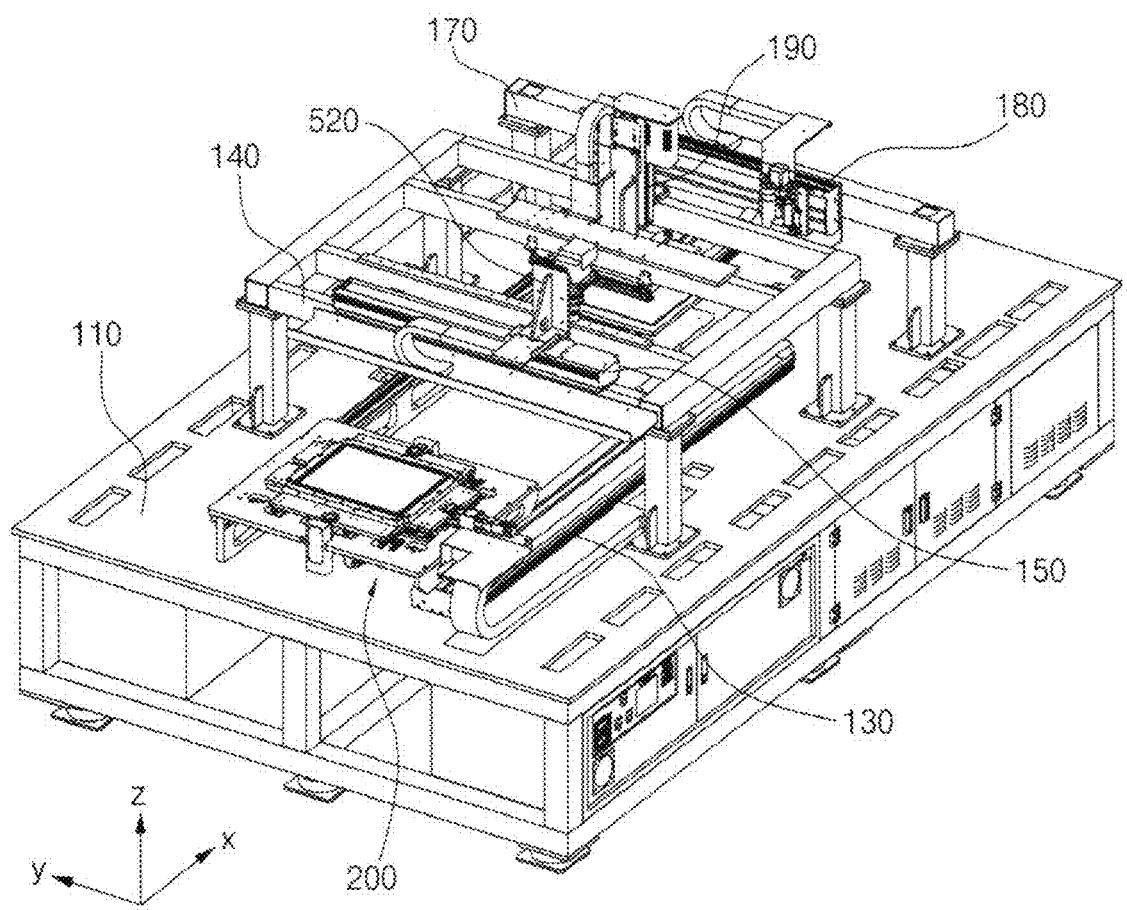
FIG. 2 is a perspective view illustrating a state in which a cover of the system for inspecting thin glass according to an embodiment of the invention is removed.
Figure 3:
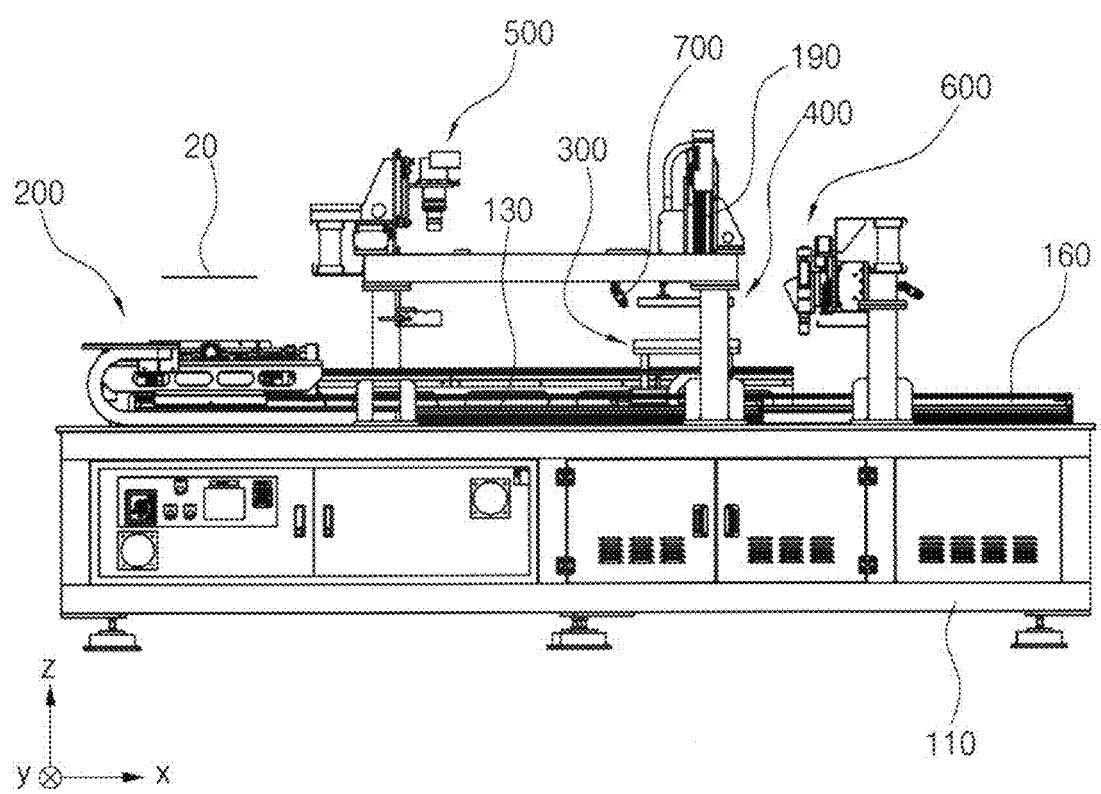
FIG. 3 is a front view illustrating a state in which the cover of the system for inspecting thin glass according to an embodiment of the invention is removed.

FIG. 1 is a perspective view of a system for inspecting thin glass according to an embodiment of the invention. FIG. 2 is a perspective view illustrating a state in which a cover of the system for inspecting thin glass according to an embodiment of the invention is removed. FIG. 3 is a front view illustrating a state in which the cover of the system for inspecting thin glass according to an embodiment of the invention is removed.

A thin glass 20 to be inspected by the invention has a plate shape. However, since a thickness of the thin glass 20 is very thin (i.e., about 100 micrometers or less), the thin glass may not maintain its own plate shape and may be bent and deformed. Therefore, in order to inspect the thin glass 20 without deformation, a component for fixing the thin glass 20 may be desirable.

The thin glass 20 inspected by the system 10 for inspecting the thin glass 20 according to an embodiment of the invention may have a rectangular plate shape, but the shape of the thin glass 20 may not be necessarily limited to a rectangular shape, and various shape of the thin glass 20 may be inspected by the system 10 for inspecting the thin glass according to an embodiment.

However, hereinafter, for convenience of description, the thin glass 20 may be defined as having the rectangular shape as a preferred embodiment. In addition, it may be defined that a width in the first axis X direction of the thin glass 20 is shorter than a width in the second axis Y direction.

Figure 5:
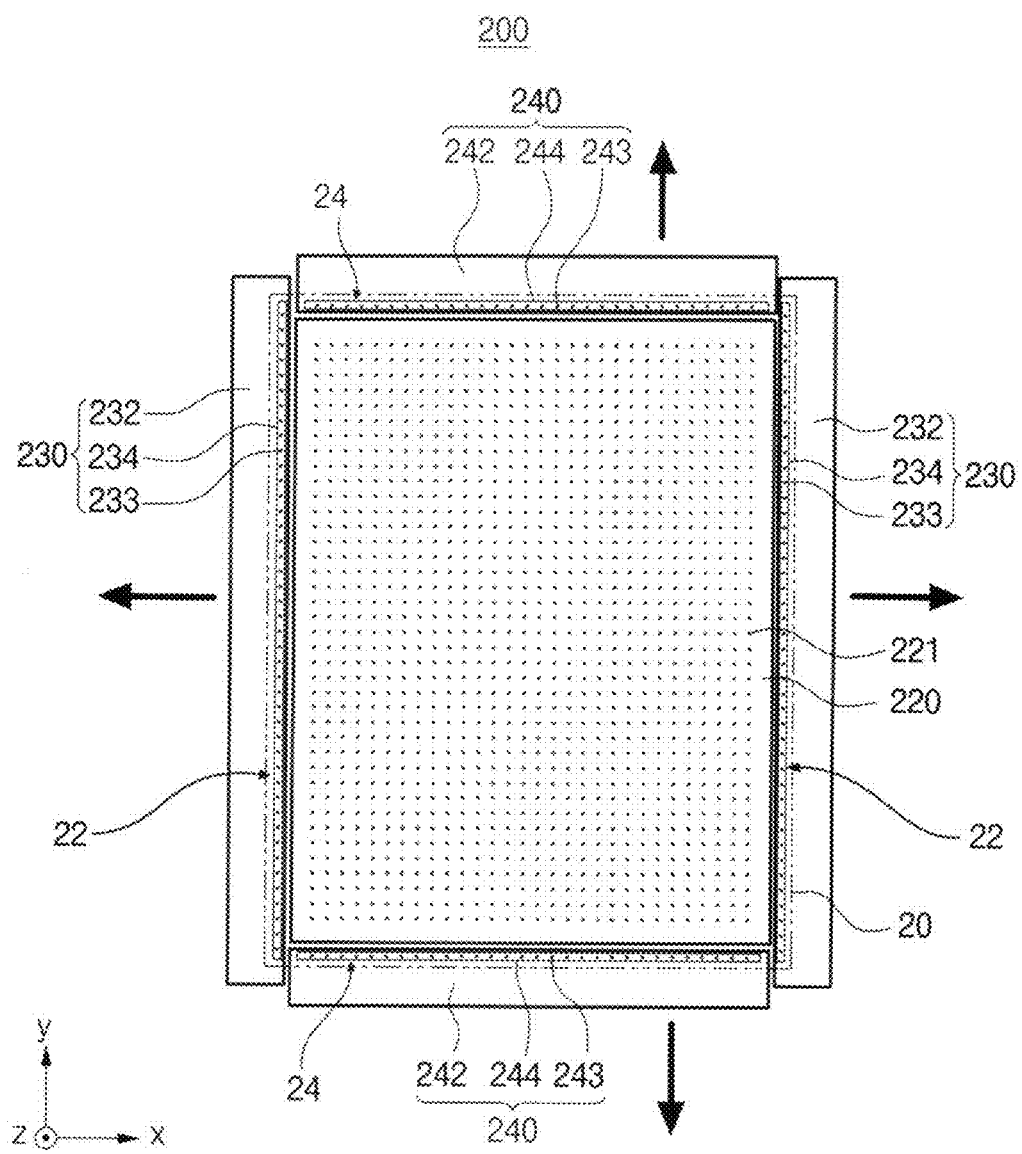
FIG. 5 is a top view of the first shuttle of the system for inspecting thin glass according to an embodiment of the invention.

At this time, a pair of ends arranged on the first axis of the rectangular thin glass 20 may be defined as a first side portion 22 extended in the second axis Y direction, and a pair of ends arranged on the second axis may be defined as a second side portion 24 extended in the first axis X direction (see FIG. 5).

Referring to FIGS. 1 to 3, the system 10 for inspecting thin glass according to an embodiment of the invention may include a housing 100, a first shuttle 200, a first inspection part 500, a transport shuttle 400, a second shuttle 300 and a second inspection part 600.

As illustrated in FIG. 1, the housing 100 may include a body 110 and a cover 120.

The body 110 may have preferably a shape of a rectangular parallelepiped having a flat upper surface.

Inside the body 110, for example, a power supply part and a storage medium may be disposed as various components that may be used for the thin glass inspection system 10.

As illustrated in FIG. 1, the cover 120 may be coupled to the body 110 to cover the upper surface of the body 110. The cover 120 may be preferably formed in a shape of the rectangular parallelepiped in a state coupled to the body 110.

As illustrated in FIG. 1, a front and rear surfaces of the cover 120 in the X direction may be opened. Although not illustrated in the drawings, a separate device may be disposed on a front side of the housing 100 to move the thin glass 20 toward the upper surface of the body 110 through the front surface of the cover 120.

In addition, although not illustrated in the drawings, when an inspection of the thin glass 20 is finished, the separate device disposed on the rear side of the housing 100 may move the thin glass 20 from the upper surface of the body 110 to the outside through the rear surface of the cover 120.

As illustrated in FIG. 2, a first shuttle guide 130 and a second shuttle guide 160 may be disposed on the upper surface of the body 110.

As illustrated in FIG. 2, the first shuttle guide 130 may extend from a front end portion of the upper surface of the body 110 to a central portion of the upper surface of the body 110. The first shuttle guide 130 may guide a reciprocating movement of the first shuttle 200 in the first axis direction, which will be described later.

As illustrated in FIG. 3, the second shuttle guide 160 may extend from the central portion of the upper surface of the body 110 to a rear end portion of the upper surface of the body 110. The second shuttle guide 160 may guide a reciprocating movement of the second shuttle 300 in the first axis X direction, which will be described later.

Figure 9:
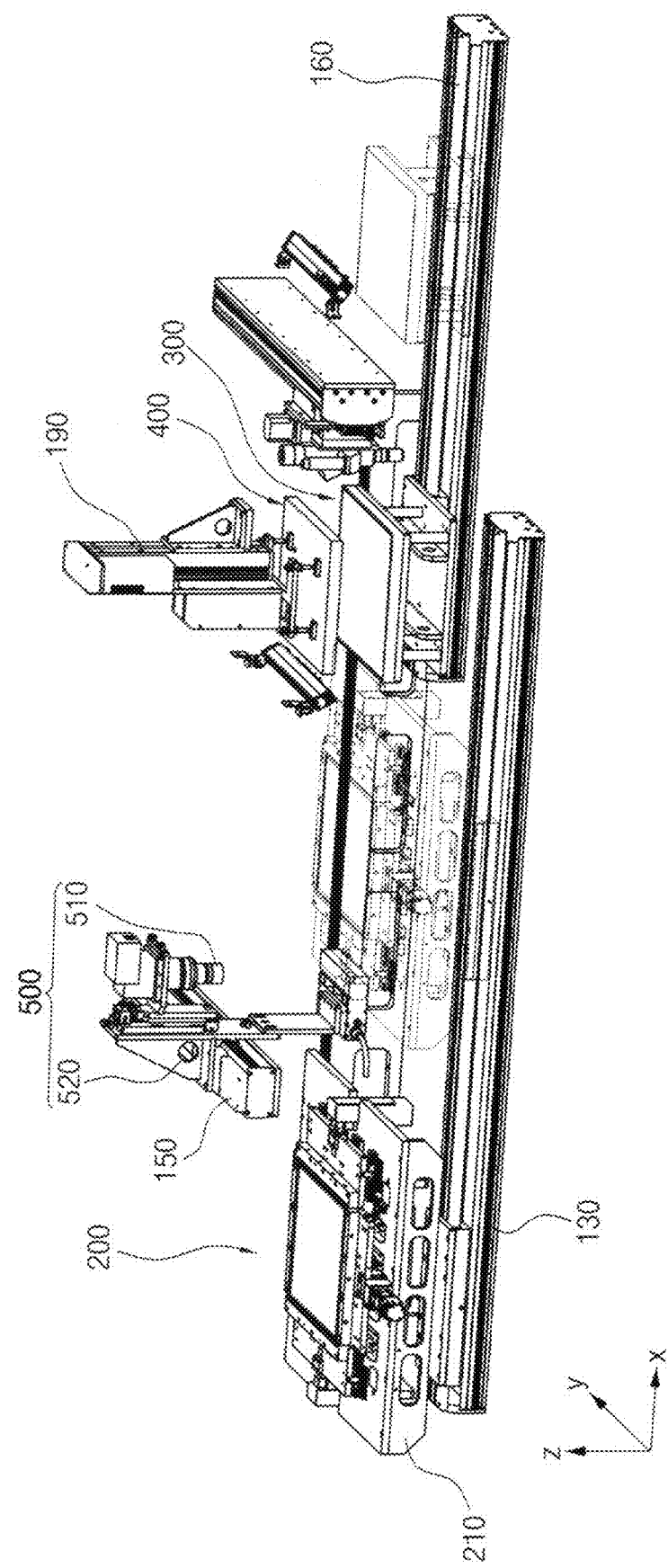
FIG. 9 is a view illustrating a state in which the thin glass of the system for inspecting thin glass according to an embodiment of the invention is transported.

The second shuttle guide 160 may be disposed to be spaced apart from the first shuttle guide 130 in the second axis Y direction. Accordingly, as illustrated in FIGS. 3 and 9, the rear end portion of the first shuttle guide 130 and the front end portion of the second shuttle guide 160 may be disposed parallel to each other to the central portion of the upper surface of the body 110.

As illustrated in FIG. 3, a third shuttle guide 190 may be disposed on the upper surface of the body 110 to be spaced apart from the central portion of the upper surface of the body 110.

The third shuttle guide 190 may extend in an upward direction (i.e., third axis Z direction). The third shuttle guide 190 may guide a vertical reciprocating movement of the transport shuttle 400 to be described later.

As illustrated in FIG. 2, the first shuttle 200 may be coupled to the first shuttle guide 130 with the thin glass 20 fixed on the upper side thereof, and may reciprocate in the first axis X direction from a front end portion of the upper surface of the body 110 to the central portion of the upper surface of the body 110. At this time, the thin glass 20 fixed to the first shuttle 200 may be tensioned to maintain a flat state without wrinkles. Hereinafter, a structure in which the thin glass 20 is tensioned and fixed to the first shuttle 200 will be described in detail with reference to FIGS. 4 to 6.

Figure 4:
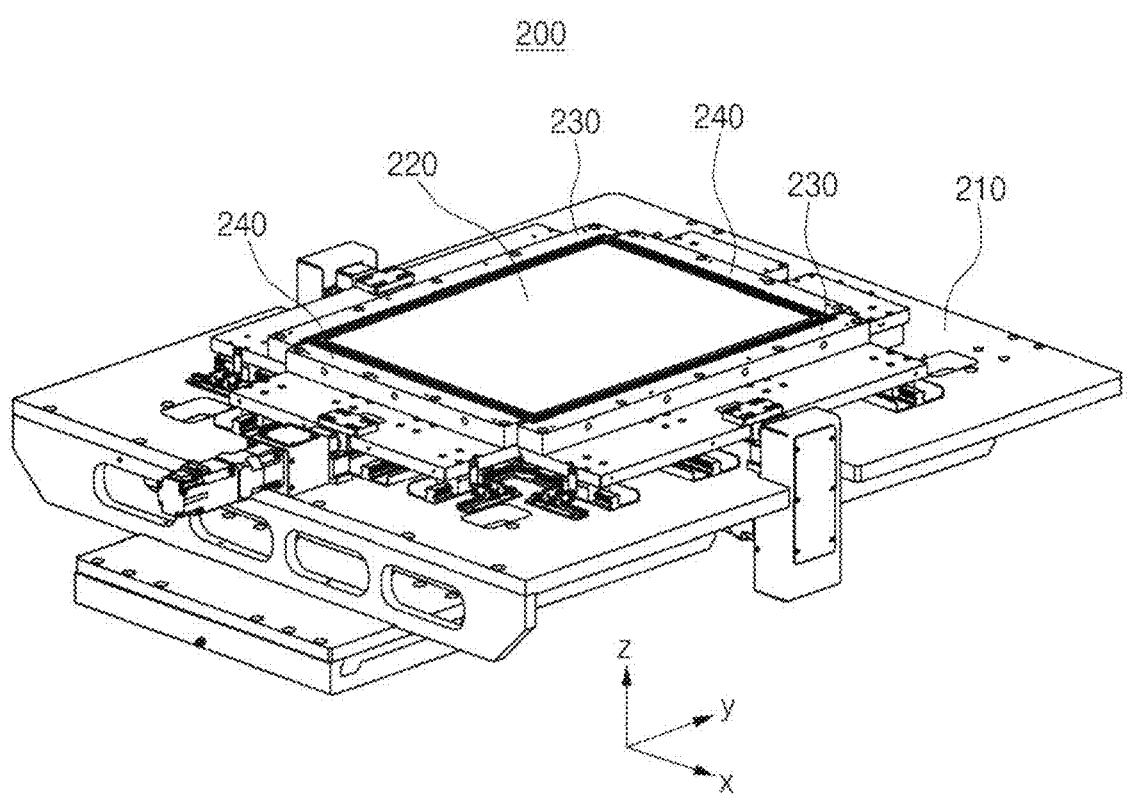
FIG. 4 is a perspective view of a first shuttle of the system for inspecting thin glass according to an embodiment of the invention.

FIG. 4 is a perspective view of a first shuttle of the system for inspecting thin glass according to an embodiment of the invention. FIG. 5 is a top view of the first shuttle of the system for inspecting thin glass according to an embodiment of the invention.

The first shuttle 200 of the system 10 for inspecting the thin glass according to an embodiment of the invention may include a first moving member 210, a first plate 220, a first tensioning part 230, and a second tensioning part 240.

The first moving member 210 may be coupled to the first shuttle guide 130 and may slide along the first shuttle guide 130. The first moving member 210 may be provided with a motor (not illustrated) which provides a driving force to move.

Accordingly, the first moving member 210 may be coupled to the first shuttle guide 130 and may reciprocate from the front end portion of the upper surface of the body 110 to the central portion of the upper surface of the body 110 in the first axis X direction (See FIG. 2).

As illustrated in FIG. 4, a first plate 220 may be provided on the first moving member 210. At this time, the first plate 220 may be disposed so that the upper surface of the first plate 220 is parallel to the upper surface of the body 110.

The thin glass 20 may be moved into the housing 100 by an external device (not illustrated) and may be disposed on the upper surface of the first plate 220. At this time, a central portion of the thin glass 20 may be located on the first plate 220. Accordingly, the central portion of the thin glass 20 may be supported by the first plate 220 without bending deformation in a direction of its own weight.

As illustrated in FIG. 5, a plurality of first plate suction holes 221 may be defined on the upper surface of the first plate 220 so that the lower surface of the thin glass 20 is adsorbed to the upper surface of the first plate 220. The plurality of first plate suction holes 221 may be preferably arranged in the first axis X direction and the second axis Y direction with a predetermined interval, but there is no limitation on the arrangement position. In addition, the number of the plurality of first plate suction holes 221 is not limited, and may vary depending on the size of the first plate 220.

When the thin glass 20 is disposed on the upper surface of the first plate 220 and adsorption occurs by the first plate suction holes 221, the thin glass 20 may be fixed to the first plate 220.

As illustrated in FIG. 5, side end portions in the first axis X direction of the thin glass 20 that the first plate 220 does not support, that is, a pair of the first side portions 22, may be supported by the first tensioning part 230.

To this end, the first tensioning part 230 of the system 10 for inspecting the thin glass 20 according to an embodiment of the invention may include a pair of first tensioning plates 232.

The pair of first tensioning plates 232 may be spaced apart from a left and right ends of the first plate 220 as illustrated in FIG. 5, respectively.

The first tensioning plate 232 may extend in the second axis Y direction. At this time, as illustrated in FIG. 5, a length of the first tensioning plate 232 may be preferably longer than a width of the first plate 220 in the second axis Y direction.

At least one first suction holes 233 may be defined in the pair of first tensioning plates 232, like the first plate 220. The first suction holes 233 may adsorb the lower surface of the first side portion 22 of the thin glass 20 to the upper surface of the first tensioning plate 232.

At this time, the pair of first tensioning plates 232 may tension the thin glass 20 when adsorbing the first side portion 22 of the thin glass 20 so that the thin glass 20 is tensioned in the first axis X direction. Accordingly, wrinkles extended in the second axis Y direction of the thin glass 20 may be effectively prevented.

At this time, as illustrated in FIG. 5, a first contact member 234 may be provided on the upper surface of the first tensioning plate 232.

The first suction holes 233 may be formed in a state in which the first contact member 234 is disposed on the upper surface of the first tensioning plate 232. Accordingly, the first contact member 234 may be disposed between the first side portion 22 of the thin glass 20 and the first tensioning plate 232.

The first contact member 234 may increase a frictional force acting on the lower surface of the first side portion 22 when the first tensioning plate 232 tensions the thin glass 20 in the first axis X direction in a state in which the lower surface of the first side portion 22 of the thin glass 20 is adsorbed by the first suction holes 233. Accordingly, it is possible to effectively prevent the thin glass 20 from slipping away from the first tensioning plate 232.

The first contact member 234 may include a urethane component to increase frictional force. At this time, a component ratio of the urethane component of the first contact member 234 may be preferably about 20 percentages (%) to about 30%, and more preferably, the component ratio of the urethane component may be about 25%. However, there is no limitation in the type and ratio of the components, if the component of the first contact member 234 is a component capable of increasing the frictional force by contacting the first contact member 234 with the thin glass 20.

As illustrated in FIG. 5, the side end portions in the second axis Y direction of the thin glass 20 in which the first plate 220 and the first tensioning plate 232 cannot support, that is, a pair of second side portions 24, may be supported by a second tensioning part 240.

The second tensioning part 240 may tension the thin glass 20 in the second axis Y direction when fixing the second side portion 24 of the thin glass 20. The second tensioning part 240 may effectively prevent wrinkles extended in the first axis X direction which may occur in the thin glass 20.

To this end, the second tensioning part 240 of the system 10 for inspecting the thin glass according to an embodiment of the invention may include a pair of second tensioning plates 242. However, a description overlapping with the first tensioning plate 232 will be briefly described below.

The second tensioning plate 242 may extend in the first axis X direction. At least one second suction hole 243 may be defined in the second tensioning plate 242 for adsorbing the lower surface of the second side portion 24 of the thin glass 20 like the first tensioning plate 232.

At this time, as illustrated in FIG. 5, a second contact member 244 may be provided on the upper surface of the second tensioning plate 242 like the first tensioning plate 232.

As for the second contact member 244, the second tensioning plate 242 is attached to the thin glass 20 in a state in which the lower surface of the second side portion 24 of the thin glass 20 is adsorbed by the second suction hole 243. Therefore, it is possible to prevent the thin glass 20 from slipping away from the second tensioning plate 242 by increasing the frictional force acting on the lower surface of the second side portion 24 when stretching in the second axis direction.

The second contact member 244 may increase a frictional force acting on the lower surface of the second side portion 24 when the second tensioning plate 242 tensions the thin glass 20 in the second axis Y direction in a state in which the lower surface of the second side portion 24 of the thin glass 20 is adsorbed by the second suction hole 243. Accordingly, it is possible to effectively prevent the thin glass 20 from slipping away from the second tensioning plate 242.

At this time, since the second contact member 244 may have the same material as the first contact member 234, a detailed description of the material may be omitted.

Even when the thin glass 20 is tensioned using the first tensioning plate 232 and the second tensioning plate 242, it may be possible to effectively prevent the thin glass 20 from being damaged or from being wrinkled in another direction, as illustrated in FIG. 5, a length of the second tensioning plate 242 may be preferably the same as the length of the first plate 220 in the first axis X direction.

That is, as a long side of the thin glass 20, the length of the first tensioning plate 232 that tensions the first side portion 22 may be longer than the length of the first plate 220 in the second axis Y direction. As the short side of the thin glass 20, the length of the second tensioning plate 242 that tensions the second side portion 24 may be the same as the length of the first plate 220 in the first axis X direction.

In addition, in order to prevent the thin glass 20 from being damaged or wrinkled in other directions, the second tensioning part 240 may preferably tension the second side portion 24 after tensioning the first side portion 22.

When edges of the thin glass 20 are adsorbed and fixed by the first tensioning part 230 and the second tensioning part 240, it may be stopped adsorbing the central portion of the thin glass 20 to the first plate 220 through the first plate suction holes 221.

At this time, in order to inspect the thin glass 20 in a state in which the edge of the thin glass 20 is adsorbed and fixed by the first tensioning part 230 and the second tensioning part 240, the first plate 220 may move in a lower direction (i.e., direction opposite to the third axis Z direction). Hereinafter, this will be described in detail with reference to FIGS. 6A and 6B.

Figure 6A:
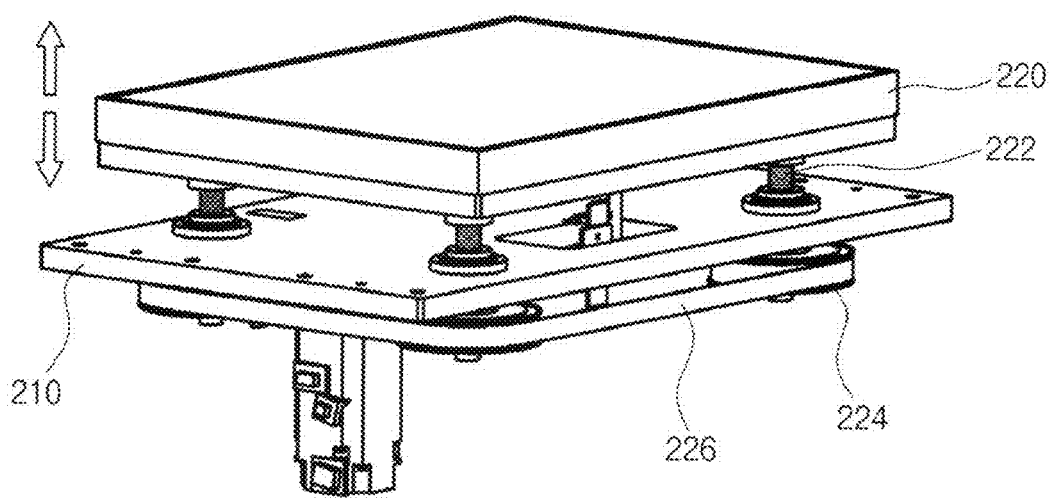
FIGS. 6A and 6B are a perspective view viewed from one direction and a perspective view from another direction of a first plate of the system for inspecting thin glass according to an embodiment of the invention, respectively.
Figure 6B:
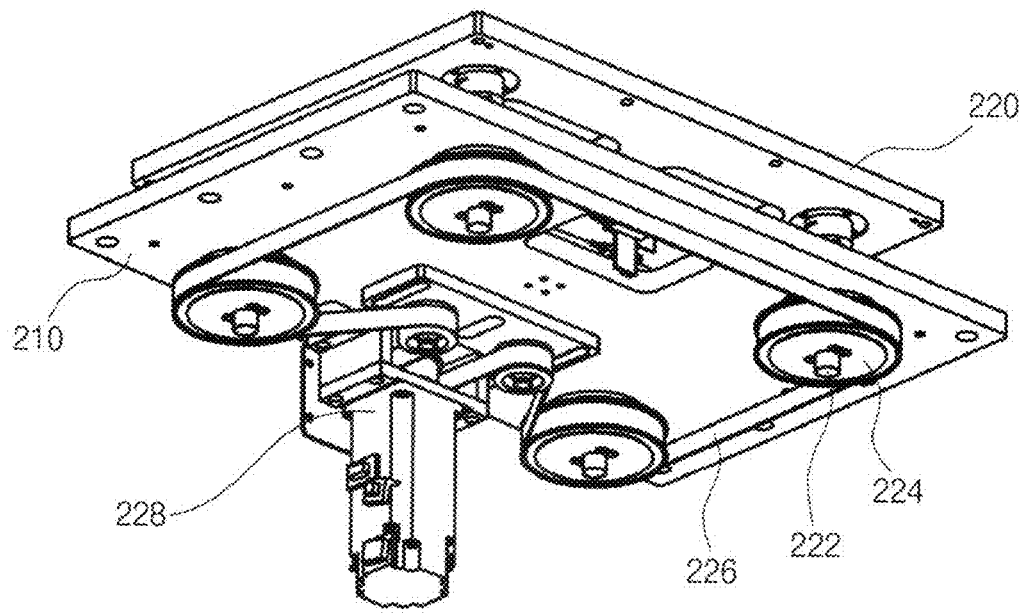

FIGS. 6A and 6B are a perspective view viewed from one direction and a perspective view from the other direction of a first plate of the system for inspecting thin glass according to an embodiment of the invention, respectively.

The first shuttle 200 of the system 10 for inspecting the thin glass according to an embodiment of the invention may include a support part 222, a rotating member 224, a connecting member 226, and a driving part 228.

As illustrated in FIG. 6A, the support part 222 may be screwed to the first moving member 210. The first plate 220 may be connected to and supported on an upper portion of the support part 222.

The support part 222 may be preferably disposed on each of four vertex sides of the lower surface of the first plate 220 having a rectangular shape, but the number or position of the support part 222 is not limited.

As illustrated in FIG. 6B, the support part 222 may be disposed to penetrate the first moving member 210 in a state being screwed to the first moving member 210. The rotating member 224 may be provided in the other end of the support part 222 as illustrated in FIG. 6B. The rotating member 224 may have a cylindrical shape having a side surface.

The connecting member 226 may be connected to the side surfaces of the plurality of rotating members 224 to connect the plurality of the support parts 222. In addition, the driving part 228 may be connected to the connecting member 226 to rotate the plurality of rotating members 224 using the connecting member 226.

At this time, when the driving part 228 rotates the connecting member 226, the rotating member 224 connected to the connecting member 226 may rotate, and the support part 222 screwed to the first moving member 210 may move in an upward direction or a downward direction according to a rotating direction of the connecting member 226. Accordingly, the first plate 220 may also move in the upward direction or the downward direction.

Accordingly, when the first tensioning part 230 and the second tensioning part 240 fix the edge of the thin glass 20, the first plate 220 may be moved in the downward direction by operation of the driving part 228. Accordingly, the central portion of the thin glass 20 may be disposed to be spaced apart from the upper side of the first plate 220 lowered to downward. However, since the first tensioning part 230 and the second tensioning part 240 maintain the state in which the thin glass 20 is tensioned, the central portion of the thin glass 20 may not be deformed by bending in the direction of its own weight.

Figure 7:
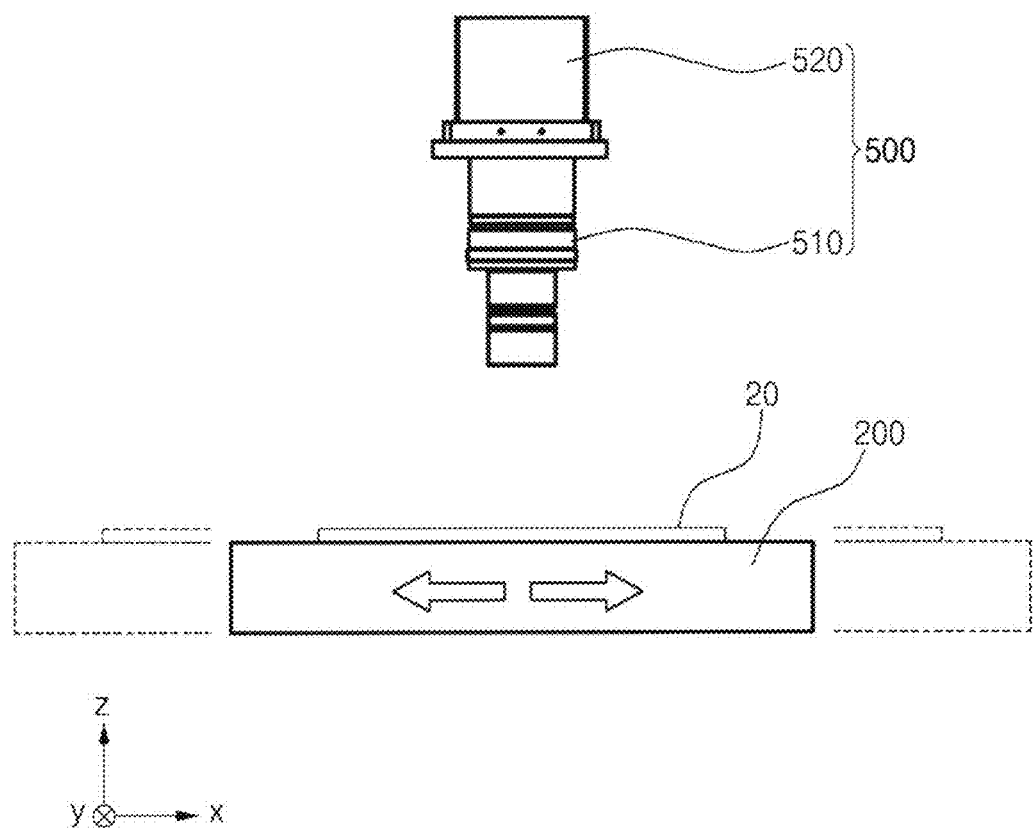
FIG. 7 is a side view of a first photographing part of the system for inspecting thin glass according to an embodiment of the present invention as viewed in a second axis direction.
Figure 8:
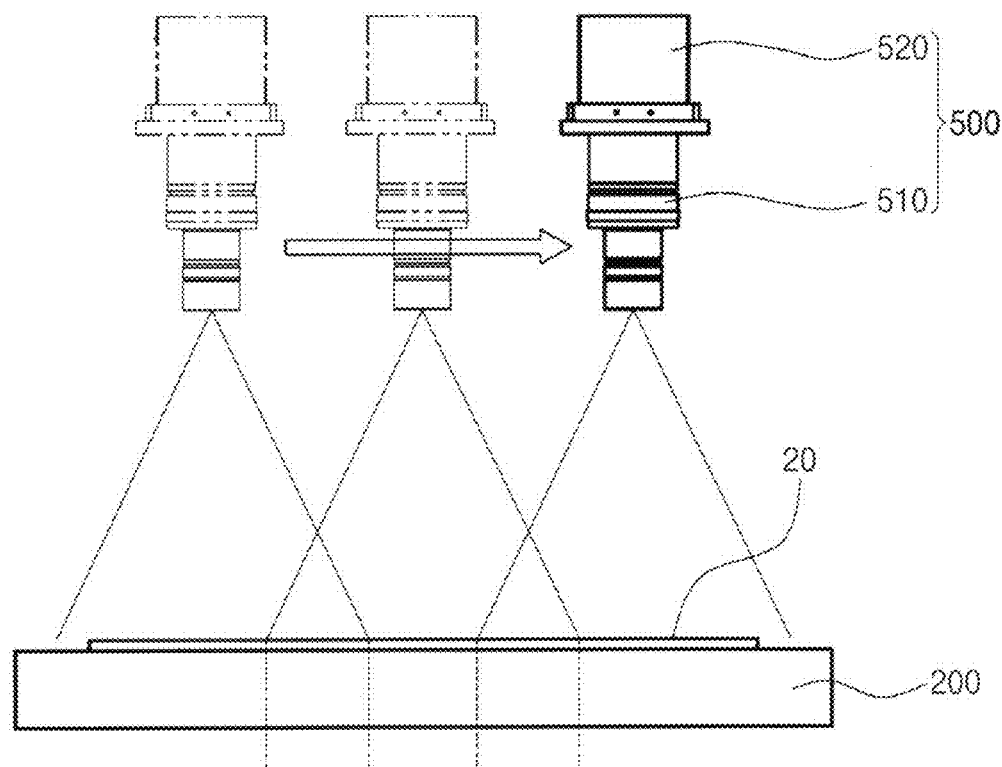
FIG. 8 is a side view of the first photographing part of the system for inspecting thin glass according to an embodiment of the invention as viewed in a first axis direction.

FIG. 7 is a side view of a first photographing part of the system for inspecting thin glass according to an embodiment of the present invention as viewed in a second axis direction. FIG. 8 is a side view of the first photographing part of the system for inspecting thin glass according to an embodiment of the invention as viewed in a first axis direction.

The first inspection part 500 for inspecting the thin glass 20 may be disposed upwardly spaced apart from the central portion of the first shuttle guide 130 (See FIG. 3).

At this time, as illustrated in FIG. 7, in the state in which the first plate 220 is lowered, the first moving member 210 may move backward (e.g., the first axis X direction) and may reach between the first inspection part 500 and the central portion of the upper surface of the body 110. Accordingly, the thin glass 20 may be positioned between the first inspection part 500 and the central portion of the upper surface of the body 110 while being fixed to the first shuttle 200.

The first inspection part 500 may measure the position of the defect formed in the thin glass 20 by photographing the upper surface of the thin glass 20 disposed under the first inspection part 500.

At this time, in order for the first inspection part 500 to inspect the entire upper surface of the thin glass 20, the first inspection part 500 of the system 10 for inspecting the thin glass 20 according to an embodiment of the invention may include a fourth moving member 520, a first camera 510, and a first controller (not illustrated).

As illustrated in FIG. 7, when the first moving member 210 moves in the first axis X direction along the first shuttle guide 130, the first camera 510 may photograph the upper surface of the thin glass 20.

At this time, as an embodiment, the first camera 510 may be a Time-Delay Integration ("TDI") camera for line scanning the upper surface of the thin glass 20. However, the first camera 510 according to the invention does not necessarily have to be a TDI camera, and there is no limitation in a range of an area in which the first camera 510 can photograph.

The first camera 510 may be coupled to the fourth moving member 520 to reciprocate in the second axis Y direction. The fourth moving member 520 may reciprocate in the second axis Y direction to be coupled to a first camera guide 150 extending in the second axis Y direction. At this time, the first camera guide 150 may be supported by a first support member 140 protruding upward from the upper surface of the body 110 and formed to extend in the second axis Y direction from the protruding upper end portion thereof (See FIGS. 2 and 9).

At this time, the first control part (not illustrated) may control the first camera 510 to photograph the thin glass 20 while moving left and right in order to photograph the entire upper surface of the thin glass 20 in a case in which a range of a line that can be photographed by the first camera 510 is smaller than the width of the thin glass 20 in the second axis Y direction.

To explain this in more detail, as illustrated in FIG. 7, the thin glass 20 may reciprocate back and forth under the first camera 510 while fixed to the first shuttle 200 by the first control part (not illustrated). At this time, as illustrated in FIG. 8, the first camera 510 may photograph a portion of the thin glass which has not been photographed when the first camera 510 moves to the right or left by a predetermined distance. At this time, the entire upper surface of the thin glass 20 may be photographed by collecting the photographed image information. Accordingly, it may be possible to measure the position information on the plane of the defect formed on the thin glass 20 in the photographed image.

At this time, the number of times the first shuttle 200 reciprocates and the number of times the first camera 510 photographs while moving may vary depending on an area of the thin glass 20, and the first control part (not illustrated) may increase the number of times above until all the upper surface of the thin glass 20 are photographed.

When the inspection is completed by the first inspection part 500, the first plate 220 may rise again and may support the central portion of the lower surface of the thin glass 20 again. In addition, the thin glass 20 may be adsorbed to the first plate 220 by the first plate suction holes 221 (see FIG. 5).

Figure 10:
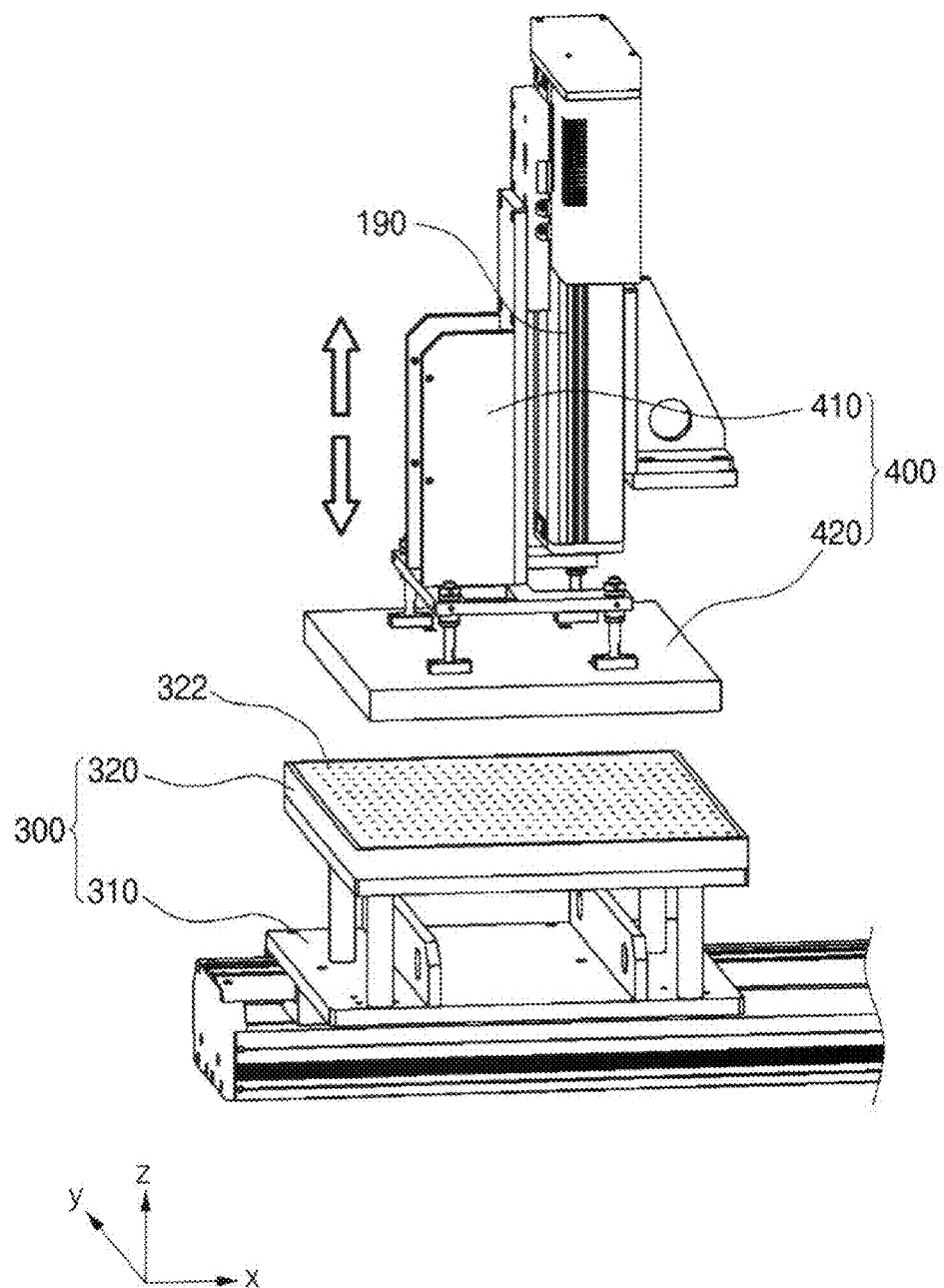
FIG. 10 is a view illustrating a transport shuttle and a second shuttle of the system for inspecting thin glass according to an embodiment of the invention.

FIG. 9 is a view illustrating a state in which the thin glass of the system for inspecting thin glass according to an embodiment of the invention is transported. FIG. 10 is a view illustrating a transport shuttle and a second shuttle of the system for inspecting thin glass according to an embodiment of the invention.

As illustrated in FIG. 9, the thin glass 20 that has been inspected by the first inspection part 500 may be disposed in the central portion of the body 110 by the first shuttle 200 while being adsorbed to the first plate 220. At this time, the thin glass 20 may be separated from the first shuttle 200 and may move to the lower side of the transport shuttle 400.

To this end, the transport shuttle 400 of the system 10 for inspecting the thin glass 20 according to an embodiment of the invention may include a third moving member 410 and a third plate 420.

The third moving member 410 may reciprocate in the third axis Z direction while being coupled to the third shuttle guide 190.

At this time, as illustrated in FIG. 10, the third plate 420 may be coupled to the third moving member 410 disposed to face the first plate 220. The third plate 420 may move up and down as the third moving member 410 moves.

A plurality of the third plate suction holes (not shown) may be defined in the third plate 420. The plurality of the third plate suction holes may adsorb the upper surface of the thin glass 20 moved by the first shuttle 200 to the lower surface of the third plate 420. In this case, a description of the arrangement and the number of the third plate suction holes may be similar with those of the first plate suction holes 221 and thus may be omitted.

Accordingly, the first shuttle 200 may arrive at the rear end portion of the first shuttle guide 130 along the first shuttle guide 130. At this time, the first plate 220, the thin glass 20, and the third plate 420 may be sequentially arranged in a vertical direction (i.e., the third axis Z direction). Thereafter, the third moving member 410 may descend so that the lower surface of the third plate 420 contacts the upper surface of the thin glass 20.

At this time, the upper surface of the thin glass 20 may be adsorbed to the lower surface of the third plate 420 through the third plate suction holes of the third plate 420. On the other hand, a state in which the thin glass 20 is adsorbed through the suction holes defined in the first plate 220, the first tensioning plate 232, and the second tensioning plate 242 may be stopped.

When the third plate 420 rises with the thin glass 20 attached thereto, the first shuttle 200 may move to the front end portion of the first shuttle guide 130 again and may prepare to load the next thin glass 20.

At this time, as illustrated in FIG. 10, the second shuttle 300 may move to the front end portion of the second shuttle guide 160, and the transport shuttle 400 may descend again to transport the thin glass 20 to the second shuttle 300.

To this end, the second shuttle 300 of the system 10 for inspecting the thin glass 20 according to an embodiment of the invention may include a second moving member 310 and a second plate 320.

The second moving member 310 may reciprocate in the first axis X direction while being coupled to the second shuttle guide 160.

At this time, as illustrated in FIG. 10, the second plate 320 disposed to face the third plate 420 may be coupled to the second moving member 310. The second plate 320 may move back and forth in the first axis X direction as the second moving member 310 moves.

A plurality of second plate suction holes 322 may be defined in the second plate 320. The plurality of second plate suction holes 322 may adsorb the lower surface of the thin glass 20, moved by the transport shuttle 400, to the upper surface of the second plate 320. In this case, a description of the arrangement and the number of the second plate suction holes 322 may be similar with those of the first plate suction holes 221 and thus may be omitted.

Accordingly, the second shuttle 300 may arrive at the front end portion of the second shuttle guide 160 along the second shuttle guide 160. At this time, the second plate 320, the thin glass 20, and the third plate 420 may be sequentially arranged in the vertical direction. Thereafter, the third moving member 410 may descend so that the upper surface of the second plate 320 contacts the lower surface of the thin glass 20.

At this time, an adsorption through the third plate suction holes of the third plate 420 may be stopped and the thin glass 20 may be adsorbed to the second plate 320 through the second plate suction holes 322.

When the third plate 420 rises, the second shuttle 300 may move backward along the second shuttle guide 160 while the thin glass 20 is fixed to the second shuttle 300. Accordingly, the second shuttle 300 may move to the lower side of the second inspection part 600 disposed to be spaced upward from the central portion of the second shuttle guide 160.

At this time, the system 10 for inspecting the thin glass 20 according to an embodiment of the invention may include an ionizer 700.

Due to a characteristic of a thin structure of the thin glass 20, when static electricity is generated, the thin glass 20 may not be fixed to the second plate 320 and may slide off.

The ionizer 700 may be disposed to face the upper surface of the second plate 320 to prevent the static electricity from being generated in the second plate 320. However, since an operation method of the ionizer 700 is known, a detailed description thereof will be omitted (See FIG. 3).

Figure 11:
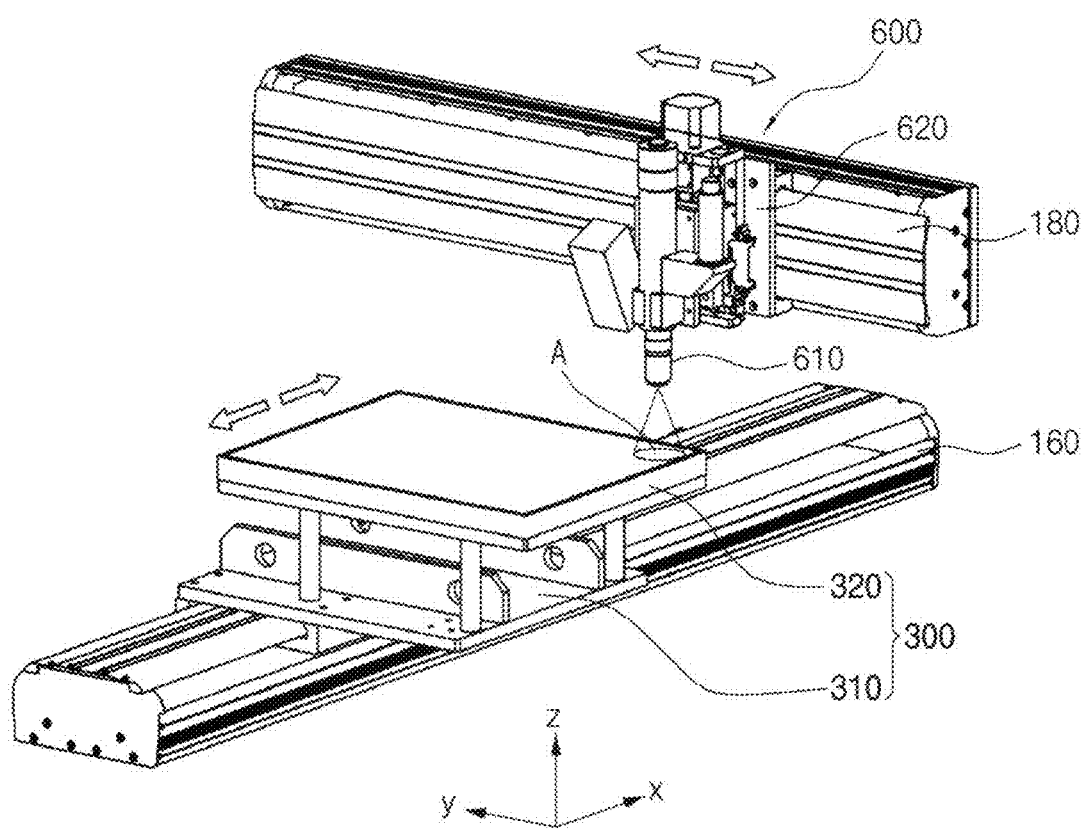
FIG. 11 is a view illustrating a state in which a second inspection part of the system for inspecting thin glass according to an embodiment of the invention inspects.
Figure 12:
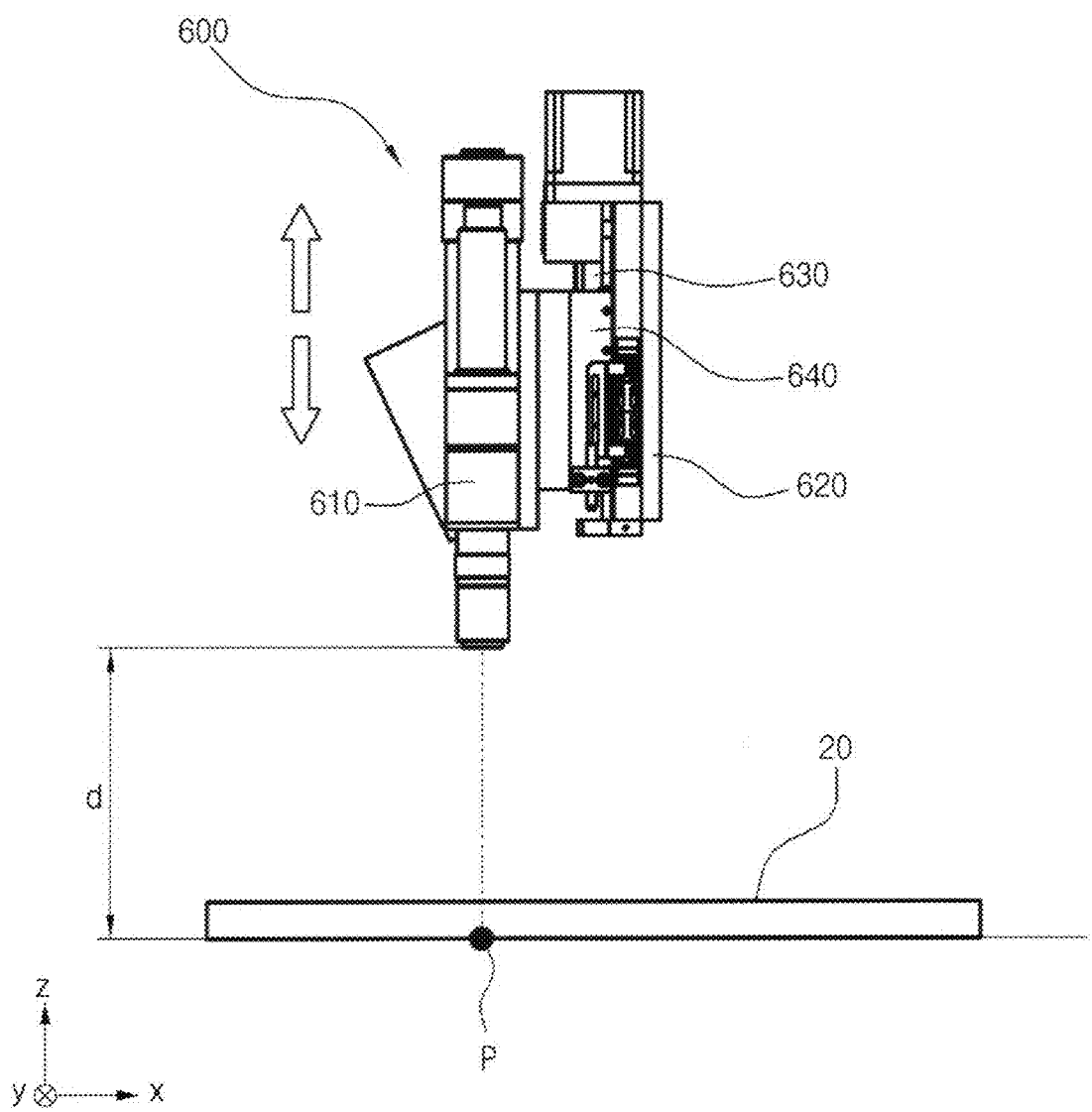
FIG. 12 is a side view of the second inspection part of the system for inspecting thin glass according to an embodiment of the invention.

FIG. 11 is a view illustrating a state in which a second inspection part of the system for inspecting thin glass according to an embodiment of the invention inspects. FIG. 12 is a side view of the second inspection part of the system for inspecting thin glass according to an embodiment of the invention.

The second inspection part 600 may inspect the individual defect in more detail by taking an enlarged picture of a corresponding position based on a planar position information of the defect of the thin glass 20 measured by the first inspection part 500.

To this end, the second inspection part 600 of the system 10 for inspecting the thin glass 20 according to an embodiment of the invention may include a fifth moving member 620, a second camera 610 and a second control part (not illustrated).

As illustrated in FIG. 11, the second camera 610 may photograph the upper surface of the thin glass 20 when the second moving member 310 moves in the first axis X direction along the second shuttle guide 160.

At this time, as illustrated in FIG. 11, the second camera 610 may be coupled to the fifth moving member 620 and may reciprocate in the second axis Y direction. The fifth moving member 620 may reciprocate while being coupled to the second camera guide 180 formed to extend in the second axis Y direction. In this case, the second camera guide 180 may be supported by a second support member 170 protruding upward from the upper surface of the body 110 and extending in the second axis Y direction from the protruding upper end portion thereof (See FIG. 2).

At this time, the second control part (not illustrated) may transport the second shuttle 300 and the fifth moving member 620 by using the plane position information on the defect of the thin glass 20 measured by the first inspection part 500. The second control part may take an enlarged picture of a specific area A at a specific location. Accordingly, it is possible to distinguish the type of defect occurring at a specific location of the thin glass 20 through the enlarged and photographed image.

The above process may be repeated as many as the number of position information of the defect measured by the first inspection part 500 by the second control part (not illustrated).

At this time, in order to measure the position of the defect of the thin glass 20 on the third axis Z inside the thin glass 20, the second inspection part 600 of the system 10 for inspecting the thin glass 20 according to an embodiment of the invention may include a third camera guide 630 and a sixth moving member 640.

As illustrated in FIG. 12, the third camera guide 630 may be disposed on the front surface of the fifth moving member 620. The third camera guide 630 may extend in the third axis Z direction.

The sixth moving member 640 may reciprocate in the third axis Z direction while being coupled to the third camera guide 630. The second camera 610 may be coupled to the fifth moving member 620 while being coupled to the sixth moving member 640.

The second camera 610 may be set so that a focal length d of the second camera 610 does not change while photographing the defect of the thin glass 20. At this time, the second camera 610 may photograph the thin glass 20 while changing the position of the sixth moving member 640 on the third axis Z.

Since the second camera 610 cannot adjust the focal length d, if the position P of the defect inside the thin glass 20 is changed, an image of the defect taken by the second camera 610 may be blurred.

Therefore, as the second control part (not illustrated) photographs the defect repeatedly by changing the position on the third axis Z while fixing the position of the second camera 610 on the first axis X and the second axis Y and distinguishes the image in which a clear image is formed by comparing the captured image, it is possible to measure even the relative position information on the third axis Z of the defect in the thin glass 20.

When the inspection is completed by the second inspection part 600, the second shuttle 300 may move to the rear end portion of the second shuttle guide 160, and the thin glass 20 may be moved to the outside of the housing 100 by an external device.

Although the system for inspecting the thin glass according to the embodiments have been described with reference to the drawings, the illustrated embodiments are examples, and may be modified and changed by a person having ordinary knowledge in the relevant technical field without departing from the technical spirit described in the following claims.

What is claimed is:

1. A system for inspecting a thin glass to inspect a defect of the thin glass, the system comprising:
   a housing including a body and a cover covering an upper surface of the body;
   a first shuttle which fixes an edge portion of the thin glass to an upper side thereof and reciprocates from a front end portion of the upper surface of the body to a central portion of the upper surface of the body in a first axis direction;
   a first inspection part disposed on the body and which measures a position of the defect formed in the thin glass by taking a picture of the thin glass while moving in a second axis direction perpendicular to the first axis direction, wherein the thin glass is fixed to the first shuttle;
   a transport shuttle which separates the thin glass from the first shuttle moved to the central portion and fixes the thin glass on a lower side of the transport shuttle;
   a second shuttle which separates the thin glass from the transport shuttle, fixes the thin glass to an upper side of the second shuttle, and reciprocates from the central portion to a rear end portion of the upper surface of the body; and
   a second inspection part disposed on the body and spaced apart rearward from the first inspection part and which inspects the position of the defect by taking an enlarged picture of the position of the defect measured by the first inspection part, and
   wherein the first shuttle tensions and fixes the thin glass to prevent wrinkling of the thin glass.

2. The system of claim 1, wherein the thin glass has a rectangular shape such that a pair of first side portions disposed in the first axis direction and a pair of second side portions disposed in the second axis direction are formed in the edge portion,
   a first shuttle guide extending from the front end portion to the central portion is disposed on the upper surface of the body, and
   the first shuttle includes:
      a first moving member which slides along the first shuttle guide;

a first plate defining a plurality of first plate suction holes and coupled to the first moving member, the plurality of first plate suction holes adsorbing a central portion of a lower surface of the thin glass;

a first tensioning part provided on opposite sides in the first axis direction of the first plate and which adsorbs a lower surface of the first side portions of the thin glass and tensions the lower surface of the first side portions of the thin glass in the first axis direction; and a second tensioning part provided on opposite sides in the second axis direction of the first plate and which adsorbs a lower surface of the second side portions of the thin glass and tensions the lower surface of the second side portions of the thin glass in the second axis direction.

3. The system of claim 2, wherein the second tensioning part tensions the thin glass after the first tensioning part tensions the thin glass.

4. The system of claim 2, wherein the first tensioning part includes a first tensioning plate extending in the second axis direction and defining at least one first suction hole which adsorbs the lower surface of the first side portions of the thin glass, and the second tensioning part includes a second tensioning plate extending in the first axis direction and defining at least one second suction hole which adsorbs the lower surface of the second side portions of the thin glass.

5. The system of claim 4, wherein a length of the first tensioning plate in the second axis direction is greater than a length of the first plate in the second axis direction, and a length of the second tensioning plate in the first axis direction is equal to a length of the first plate in the first axis direction.

6. The system of claim 4, further comprising:

a first contact member disposed between the thin glass and the first tensioning plate to prevent the thin glass adsorbed on the first tensioning plate from being separated from the first tensioning plate during a tensioning process of the thin glass; and a second contact member disposed between the thin glass and the second tensioning plate to prevent the thin glass adsorbed on the second tensioning plate from being separated from the second tensioning plate during the tensioning process of the thin glass.

7. The system of claim 6, wherein a component ratio of urethane contained in each of the first contact member and the second contact member is about 20 percentages (%) to about 30%.

8. The system of claim 1, wherein the first shuttle reciprocates a certain number of times, wherein the first inspection part includes:

a fourth moving member spaced apart from the upper surface of the body and which reciprocates in the second axis direction;

a first camera coupled to the fourth moving member and which measures the position of the defect formed in the thin glass by taking a picture of the upper surface of the thin glass, the fourth moving member reciprocating in the second axis direction; and a first control part which determines the number of reciprocations of the first shuttle and a position of the fourth moving member according to a length of the thin glass in the second axis direction.

9. The system of claim 8, wherein the second inspection part includes:

a fifth moving member spaced apart from a rear side of the fourth moving member and which reciprocates in the second axis direction;

a second camera coupled to the fifth moving member and which takes an enlarged picture of a certain area of the upper surface of the thin glass, the fifth moving member reciprocating in the second axis direction; and a second control part which determines a position of the second shuttle and a position of the fifth moving member so that the position of the defect measured by the first camera is located in the certain area.

10. The system of claim 9, further comprising:

a third camera guide extending in a third axis direction having a predetermined angle with respect to the upper surface of the body at one side of the fifth moving member; and a sixth moving member which slides along the third camera guide, and wherein the second camera is coupled to the fifth moving member while being fixed to the sixth moving member, and the second control part controls the second camera to take a picture again while changing a position of the sixth moving member when an image of the defect located in the certain area in the enlarged picture taken by the second camera is out of focus.

11. The system of claim 2, further comprising:

a second shuttle guide extending from the central portion to the rear end portion of the upper surface of the body; and a third shuttle guide extending from the central portion to an upper side, and wherein the second shuttle includes a second moving member which slides along the second shuttle guide and a second plate defining a plurality of second plate suction holes and coupled to the second moving member, the plurality of second plate suction holes adsorbing the central portion of the lower surface of the thin glass, and the transport shuttle includes a third moving member which slides along the third shuttle guide and a third plate defining a plurality of third plate suction holes and coupled to the third moving member, the plurality of third plate suction holes adsorbing a central portion of the upper surface of the thin glass.

12. The system of claim 2, wherein the first shuttle includes:

a driving part which provides rotational power;

a support part having a first end extended to support the first plate and screwed to the first moving member; and a connecting member connecting a second end of the support part and the driving part to raise or lower the first plate by rotating the support part, wherein the second end is opposite to the first end.

* * * * *